US009080895B2

(12) United States Patent
Martin et al.

(10) Patent No.: US 9,080,895 B2
(45) Date of Patent: Jul. 14, 2015

(54) MAGNETIC POSITION SENSOR ASSEMBLY FOR MEASUREMENT OF ROTATIONAL ANGULAR POSITION OF A ROTATING STRUCTURE

(75) Inventors: Tom Martin, Fort Wayne, IN (US); David McKeeman, Fort Wayne, IN (US); Mark Vorndran, Fort Wayne, IN (US); Gary Johnson, Huntington, IN (US)

(73) Assignee: Sensata Technologies, Inc., Attleboro, MA (US)

( * ) Notice: Subject to any disclaimer, the term of this patent is extended or adjusted under 35 U.S.C. 154(b) by 327 days.

(21) Appl. No.: 13/480,692

(22) Filed: May 25, 2012

(65) Prior Publication Data
US 2012/0299586 A1 Nov. 29, 2012

Related U.S. Application Data

(60) Provisional application No. 61/489,751, filed on May 25, 2011.

(51) Int. Cl.
*G01B 7/30* (2006.01)
*G01D 5/14* (2006.01)

(52) U.S. Cl.
CPC ..................... *G01D 5/145* (2013.01)

(58) Field of Classification Search
CPC .................................................. G01D 5/145
USPC .............. 324/207.2, 207.21, 207.24, 207.25, 324/207.22
See application file for complete search history.

(56) References Cited

U.S. PATENT DOCUMENTS

| 4,914,389 | A | 4/1990 | Juds |
| 6,400,142 | B1 | 6/2002 | Schroeder |
| 6,411,082 | B2 | 6/2002 | Glasson |
| 6,496,003 | B1 * | 12/2002 | Okumura et al. ........ 324/207.24 |
| 6,707,293 | B2 | 3/2004 | Wan et al. |
| 6,894,487 | B2 | 5/2005 | Kunz-Vizenetz |
| 6,956,368 | B2 | 10/2005 | Johnson et al. |
| 7,363,825 | B2 | 4/2008 | Feng et al. |
| 7,420,363 | B2 | 9/2008 | Hatanaka et al. |
| 7,443,160 | B2 | 10/2008 | Wolf |
| 7,800,357 | B2 | 9/2010 | Ruetz |
| 2009/0158868 | A1 | 6/2009 | Farmer et al. |
| 2010/0163333 | A1 | 7/2010 | Patil et al. |
| 2011/0175601 | A1 * | 7/2011 | Bogos et al. ............. 324/207.25 |

OTHER PUBLICATIONS

International Search Report and Written Opinion issued in International Patent Application No. PCT/US2012/039564, mailed Aug. 31, 2012, 11 pages.

* cited by examiner

*Primary Examiner* — Jay Patidar
(74) *Attorney, Agent, or Firm* — Krieg DeVault LLP (57) ABSTRACT

A magnetic rotational position sensor assembly for measurement of a rotational angular position of a rotating structure. The sensor assembly includes a shaft member extending along a primary rotational axis for primary rotational movement in response to rotation of the rotating structure, a motion conversion member structured and configured to transform the primary rotational movement of the shaft member into secondary movement, a magnet member secured to the motion conversion member for displacement along a travel path in response to the converted secondary movement of the motion conversion member, and a non-contact magnetic sensor that senses a change in position of the magnet member by sensing a corresponding variation in the magnetic field during displacement of the magnet member along the travel path in response to rotation of the rotating structure, wherein the magnetic sensor generates an output signal representative of a relative rotational angular position of the rotating structure.

9 Claims, 7 Drawing Sheets

MAGNETIC POSITION SENSOR ASSEMBLY FOR MEASUREMENT OF ROTATIONAL ANGULAR POSITION OF A ROTATING STRUCTURE

CROSS REFERENCE TO RELATED APPLICATIONS

The present application claims the benefit of U.S. Provisional Patent Application Ser. No. 61/489,751 filed May 25, 2011, the contents of which are incorporated herein by reference in their entirety.

FIELD OF THE INVENTION

The present invention relates generally to the field of magnetic position sensors, and more particularly but not exclusively relates to a magnetic position sensor assembly for measurement of a rotational angular position of a rotating structure. In one embodiment, the magnetic position sensor assembly is used in association with an automotive steering mechanism for measurement of the absolute angular position of a steering column shaft across greater than a full revolution of the shaft. However, other embodiments and applications of the magnetic position sensor assembly are also contemplated as falling within the scope of the present invention, including other non-steering and/or non-automotive applications to measure the angular position of other types of rotating structures.

BACKGROUND

Use of a non-contacting sensor to measure the angular position of a steering column shaft or other types of rotating shafts/structures presents various challenges. Such challenges include, for example, circumstances requiring mounting of the shaft via a through-hole mounting arrangement, and/or the need to measure absolute angular position across multiple revolutions of the shaft.

The nature of non-contacting sensing, be it through the use of a Hall device, a magneto-resistive (MR) device, an inductive device, or other types of non-contacting sensor technologies, presents difficulties in properly positioning/mounting the sensor device relative to the rotating shaft. Prior sensor designs have positioned the sensor device at the end of the rotating shaft, generally in line with the rotational axis, to thereby measure angular position of the shaft via an "on-axis" sensing arrangement. However, in applications requiring through-hole mounting of the shaft, difficulties arise when attempting to position the sensor device at the end of the shaft in an on-axis sensing arrangement. Therefore, the sensor device is sometimes positioned at a location offset from the shaft and the rotational axis to measure angular position of the shaft via an "off-axis" sensing arrangement. Although somewhat cumbersome, an off-axis sensing arrangement may be used to measure the angular position of the shaft across one revolution of the shaft (i.e., across 360°). However, difficulties arise in applications requiring an off-axis sensing arrangement where measurement of angular position across greater than 360° (i.e., across greater than one full revolution of the shaft) is necessary, often requiring complex mechanical parts and/or additional electronics (i.e., more than one magnetic sensor device). In the specific case of a steering column shaft, measurement of angular position across 1800° (i.e., five revolutions) may be required.

Thus, there is a general need in the industry to provide an improved magnetic position sensor assembly for measurement of the rotational angular position of a rotating shaft. The present invention satisfies this need and provides other benefits and advantages in a novel and unobvious manner.

SUMMARY

The present invention relates generally to the field of magnetic position sensors, and more particularly but not exclusively relates to a magnetic position sensor assembly for measurement of a rotational angular position of a rotating structure.

According to one form of the present invention, a magnetic rotational position sensor assembly for measurement of a rotational angular position of a rotating structure is provided. The sensor assembly includes a shaft member extending along a primary rotational axis and structured and configured for primary rotational movement about a primary rotational axis in response to rotation of the rotating structure, a motion conversion member operatively engaged with the shaft member and structured and configured to transform the primary rotational movement of the shaft member into secondary movement of the motion conversion member different from the primary rotational movement, a magnet member secured to the motion conversion member and structured and configured for displacement along a travel path in response to the secondary movement of the motion conversion member, and a non-contact magnetic sensor structured and configured to sense a change in position of the magnet member by sensing a corresponding variation in a magnetic field generated by the magnet member during displacement along the travel path in response to the rotation of the rotating structure, and wherein the non-contact magnetic sensor generates an output signal representative of a relative rotational angular position of the rotating structure.

In one aspect of the invention, the shaft member comprises a cylindrical sleeve defining an axial passage extending therethrough along the primary rotational axis, and wherein the rotating structure comprises a drive shaft with a portion of the drive shaft positioned with the axial passage and operatively engaged with the cylindrical sleeve such that rotation of the drive shaft about the primary rotational axis correspondingly rotates the cylindrical sleeve about the primary rotational axis. In a further aspect of the invention, the drive shaft comprises a steering column shaft having a rotational range exceeding 360°, and the magnetic rotational position sensor assembly is configured to measure absolute angular position of the steering column shaft over the rotational range.

In another aspect of the invention, the non-contact magnetic sensor comprises no more than one magnetic flux sensor configured to sense a change in position of the magnet member by sensing a corresponding variation in the magnetic field generated by the magnet member during displacement of the magnet member along the travel path in response to rotation of the rotating structure.

In another aspect of the invention, neither of the magnet member and the non-contact magnetic sensor is attached to the shaft member and the magnet member and the non-contact magnetic sensor are both laterally offset from the primary rotational axis.

In another aspect of the invention, the secondary movement of the motion conversion member is provided relative to a secondary axis that is laterally offset from the primary rotational axis.

In another aspect of the invention, the secondary movement of the motion conversion member comprises secondary linear movement along a secondary linear axis arranged generally parallel with the primary rotational axis.

In another aspect of the invention, the secondary movement of the motion conversion member comprises secondary linear movement, and the magnet member is displaced along a linear travel path arranged generally parallel with and laterally offset from the primary rotational axis.

In another aspect of the invention, the secondary movement of the motion conversion member comprises secondary rotational movement about a secondary rotational axis that is laterally offset from the primary rotational axis, and in a further aspect of the invention the secondary rotational axis is arranged generally perpendicular to the primary rotational axis.

In another aspect of the invention, the secondary movement of the motion conversion member comprises secondary rotational movement, and the magnet member is displaced along a rotational travel path extending about a secondary rotational axis arranged generally perpendicular to and laterally offset from the primary rotational axis.

In another aspect of the invention, the shaft member comprises a threaded shaft extending along the primary rotational axis, the motion conversion member comprising a nut threadedly engaged with the threaded shaft, the primary rotational movement of the threaded shaft threadedly advances the nut linearly along the primary rotational axis to thereby transform the primary rotational movement of the threaded shaft into secondary linear movement of the nut, the magnet member is linearly displaced along a linear travel path extending generally parallel with the primary rotational axis in response to the secondary linear movement of the nut, and the non-contact magnetic sensor senses the change in position of the magnet member along the linear travel path in response to the rotation of the rotating structure and generates an output signal representative of the relative rotational angular position of the rotating structure. In a further aspect of the invention, the non-contact magnetic sensor comprises a sensor housing defining a channel extending therethrough and arranged generally along the linear travel path of the magnet member, and the magnet member is positioned within said channel and is linearly displaced along the channel in response to the rotation of the rotating structure. In still another aspect of the invention, the channel is bound by a pair of opposing generally planar side wall surfaces each extending generally parallel with the linear travel path, and the magnet member has a substantially cylindrical configuration defining a cylindrical outer surface configured to be slidably displaced along the generally planar side wall surfaces of the channel to guide said magnet member generally along the linear travel path. In another aspect of the invention, the non-contact magnetic sensor comprises a sensor housing defining a compartment directly adjacent and laterally offset from the linear travel path of the magnet member, the non-contact magnetic sensor comprises a magnetic flux sensor positioned within the compartment such that the magnetic flux sensor is positioned in close proximity to the magnet member, and the magnetic flux sensor senses variations in a magnetic field generated by the magnet member as said magnet member is linearly displaced along the linear travel path in response to the rotation of the rotating structure.

In another aspect of the invention, the shaft member comprises a first gear member structured and configured for rotation about the primary rotational axis, the motion conversion member comprises a second gear member structured and configured for rotation about a secondary rotational axis laterally offset from the primary rotational axis and with the second gear member intermeshingly engaged with the first gear member, wherein the primary rotational movement of the first gear member rotationally drives the second gear member and reduces the primary rotational movement about the primary rotational axis into secondary rotational movement of the second gear member about the secondary rotational axis, the magnet member is rotationally displaced along a circumferential travel path extending about the secondary rotational axis in response to the secondary rotational movement of the second gear member, and the non-contact magnetic sensor senses the change in position of the magnet member along the circumferential travel path in response to the rotation of the rotating structure and generates an output signal representative of the relative rotational angular position of the rotating structure. In a further aspect of the invention, the first gear member comprises a worm gear extending along the primary rotational axis, and the second gear member comprises a multi-tooth gear intermeshingly engaged with the worm gear with the secondary rotational axis arranged generally perpendicular to and laterally offset from the primary rotational axis of the worm gear. In still another aspect of the invention, the worm gear and the multi-tooth gear define a gearing reduction ratio therebetween of at least 2:1, and in a more specific aspect of the invention the worm gear and the multi-tooth gear define a gearing reduction ratio therebetween of approximately 5:1. In a further aspect of the invention, the non-contact magnetic sensor is arranged generally along and intersected by the secondary rotational axis. In another aspect of the invention, the magnet member is securely attached to the second gear member at a location radially offset from the secondary rotational axis. In yet another aspect of the invention, the first gear member is rotationally mounted within a gear housing to provide the primary rotational movement about the primary rotational axis, and the second gear member is rotationally mounted within the gear housing to provide the secondary rotational movement about the secondary rotational axis. In a further aspect of the invention, the gear housing defines a compartment arranged generally along the secondary rotational axis, and the non-contact magnetic sensor comprises a magnetic flux sensor positioned within the compartment and intersected by the secondary rotational axis.

Further embodiments, forms, features, aspects, benefits, objects and advantages of the present invention will become apparent from the detailed description and figures provided herewith.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is hereby intended, and that alterations and further modifications to the illustrated devices and/or further applications of the principles of the invention as illustrated herein are contemplated as would normally occur to one skilled in the art to which the invention relates.

Referring to FIGS. 1-7, shown therein is a magnetic position sensor assembly 20 according to one form of the present invention for measurement of a rotational angular position of a rotating structure. In one specific embodiment, the magnetic position sensor assembly 20 is used in association with an automotive steering mechanism to measure the absolute angular position of a steering column shaft across greater than a full revolution of the shaft. However, it should be understood that in another embodiment, the magnetic position sensor assembly 20 may used to measure the absolute angular position of a steering column shaft across one full revolution or less than one full revolution of the shaft. Additionally, it should further be understood that the magnetic position sensor assembly 20 may also be used in association with other non-steering and/or non-automotive applications to measure the angular position of other types and configurations of rotating structures.

Figure 1:
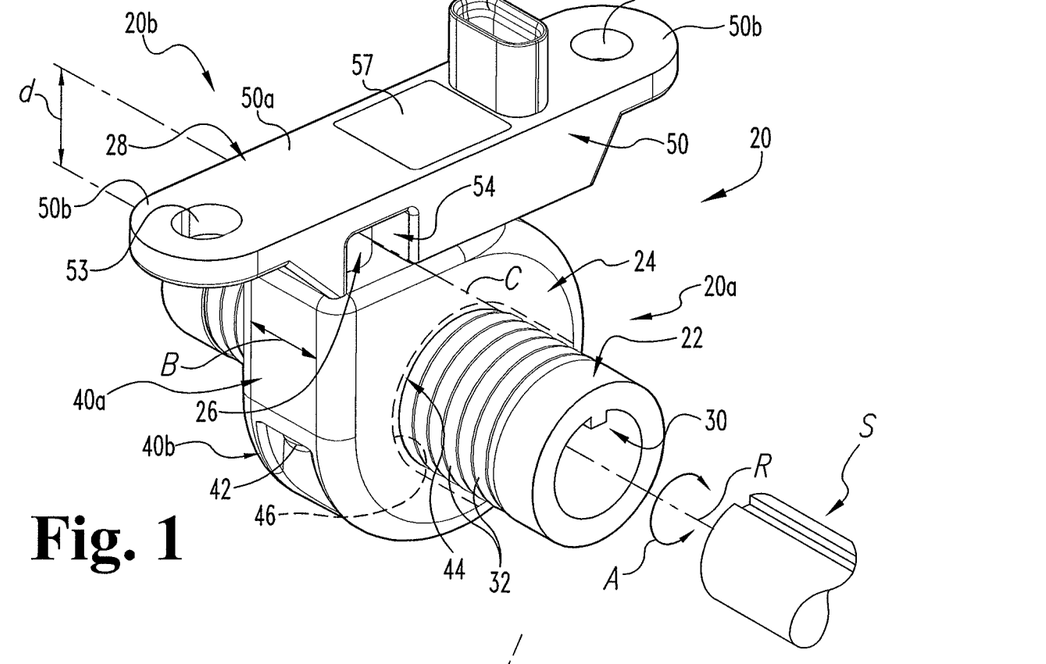
FIG. 1 illustrates a perspective view of a magnetic position sensor assembly according to one form of the present invention.

As illustrated in FIG. 1, the magnetic position sensor assembly 20 is comprised of an actuator assembly 20a and a sensor assembly 20b. In the illustrated embodiment, the actuator assembly 20a generally includes a shaft member 22 extending generally along a primary rotational axis R and structured and configured for primary rotational movement about the primary rotational axis R in response to rotation of a rotating structure S, a motion conversion member 24 engaged with the shaft member 22 and structured and configured to transform the primary rotational movement of the shaft member 22 into secondary movement different from the primary rotational movement, and a magnet member 26 secured to the motion conversion member 24 and structured and configured for displacement along a travel path in response to the secondary movement of the motion conversion member 24 to provide a magnetic field or flux for sensing by the sensor assembly 20b.

In one specific embodiment, the shaft member 22 is configured as a threaded shaft member extending generally along the primary rotational axis R, and the motion conversion member 24 is configured as a nut member threadedly engaged with the threaded shaft member 22 to convert the primary rotational movement of the shaft member 22 into secondary linear movement of the nut member 24 (and the magnet member 26) for measurement and sensing by the sensor assembly 20b. However, other configurations of the actuator assembly 20a and the motion conversion member 24 are also contemplated to convert the primary rotational movement of the shaft member 22 into other types of secondary movement for measurement by the sensor assembly 20b.

Additionally, in the illustrated embodiment, the sensor assembly 20b is provided as a non-contact magnetic sensor 28 that generally includes a sensor housing or mount 50 and a magnetic sensor device 52 positioned within and/or attached to the sensor housing 50. However, it should be understood that other types and configurations of the sensor assembly 20b are also contemplated. As will be discussed in greater detail below, at least a portion of the actuator assembly 20a is movable relative to the sensor assembly 20b, with the sensor assembly 20b remaining in a substantially stationary position. However, other embodiments are also contemplated where at least a portion of the sensor assembly 20b may be movable. Further details regarding the actuator assembly 20a and the sensor assembly 20b will be set forth below.

Referring collectively to FIGS. 1-4, in the illustrated embodiment, the threaded shaft member 22 extends generally along the primary rotational axis R and is configured for engagement with the rotating structure S. In one embodiment, the rotating structure S is configured as a drive shaft such as, for example, a rotating steering column shaft. However, as indicated above, the magnetic position sensor assembly 20 may be used in non-steering column applications to measure the angular position of other types of rotating shafts or structures. In the illustrated embodiment, the threaded shaft member 22 is configured as a cylindrical-shaped sleeve defining an axial passage 30 extending therethrough generally along the primary rotational axis R, and further defining external threads 32 or other types of thread-like structures along at least a portion of its length. The sleeve member 22 is positioned over the drive shaft S with at least a portion of the drive shaft S located within the axial passage 30. The sleeve member 22 is rotationally secured to the drive shaft S by any method known to those of skill in the art such as, for example, by providing adjacent portions of the sleeve member 22 and the drive shaft S with mating non-circular cross sections, or by rotational locking structures including keys/keyways, pins or fasteners, such that rotation of the drive shaft S correspondingly rotates the sleeve member 22 about the primary rotational axis R. In the illustrated embodiment, the drive shaft S and the sleeve member 22 each rotate about the primary rotational axis R. However, in other embodiments, the drive shaft S may rotate about an axis that is laterally and/or angularly offset from the primary rotational axis R. Although the sleeve member 22 has been illustrated and described as having a single-piece cylindrical-shaped configuration, it should be understood that other configurations are also contemplated including, for example, a multi-piece sleeve configuration and/or a solid shaft configuration. Additionally, it should be appreciated that the sleeve member 22 may be formed of any suitable material including, for example, metallic materials or non-metallic materials such as plastics or polymers.

Figure 2:
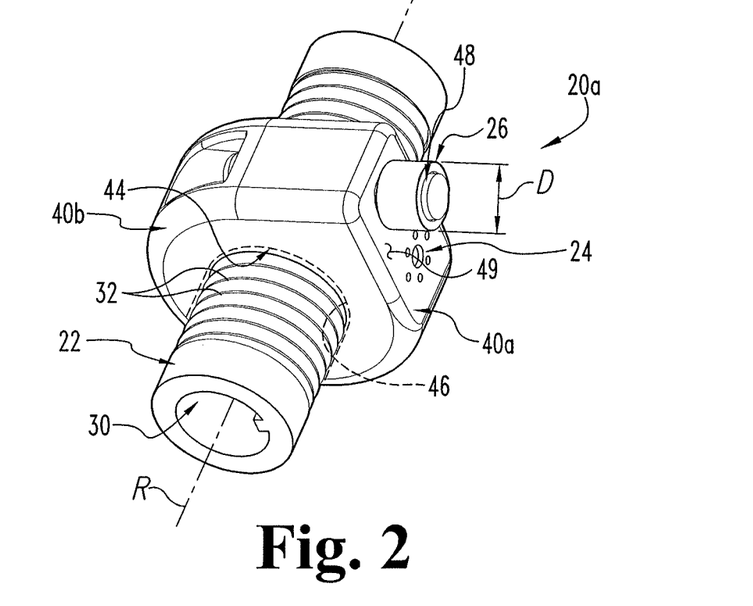
FIG. 2 illustrates a perspective view of one embodiment of an actuator assembly for use in association with the magnetic position sensor assembly of FIG. 1.
Figure 3:
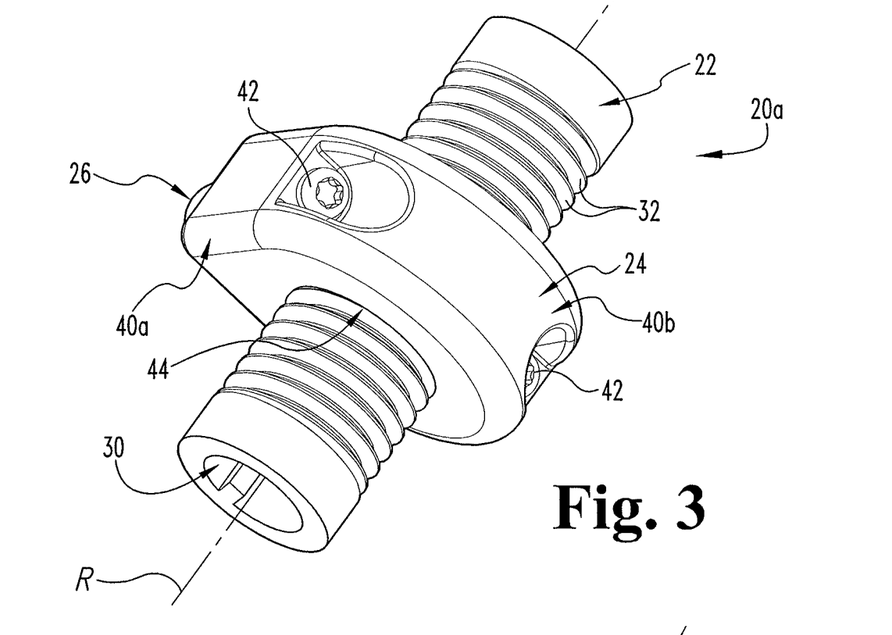
FIG. 3 illustrates another perspective view of the actuator assembly of FIG. 2.
Figure 4:
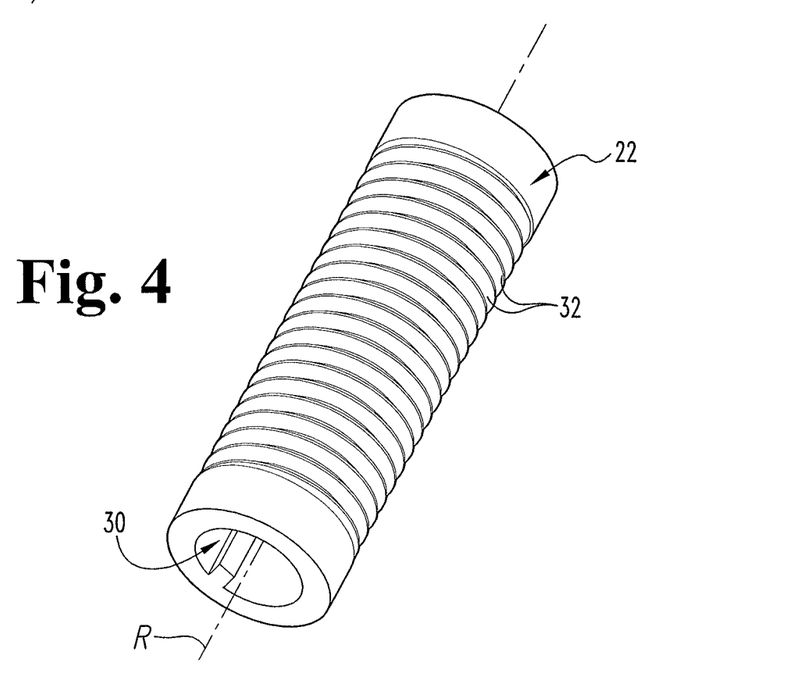
FIG. 4 illustrates a perspective view of one embodiment of a drive shaft for use in association with the actuator assembly of FIG. 2.

As indicated above, in the illustrated embodiment, the motion conversion member 24 is configured as a nut member that is threadingly engaged with the sleeve member 22 such that rotation of the sleeve member 22 about the primary rotational axis R (in response to rotation of the drive shaft S) correspondingly displaces/advances the nut member 24 in a linear fashion along the primary rotational axis R. In one embodiment, the nut member 24 is maintained in a rotationally stationary position relative to the rotating sleeve member 22 during linear displacement along the primary rotational axis R. However, in other embodiments, the nut member 24 may be provided with some degree of rotational freedom with respect to the sleeve member 22.

In the illustrated embodiment, the nut member 24 comprises a two-piece structure including a first half 40a and a second half 40b, with the first and second halves 40a, 40b secured together via a number of screws or fasteners 42 to provide the nut member 24 with a generally cylindrical configuration defining an axial opening 44 extending therethrough. Internal threads 46 or other types of helical-shaped or spiral-shaped structures are formed along at least a portion of the axial opening 44. The internal threads 46 are configured for threading engagement with the external threads 32 formed along the sleeve member 22 such that rotation of the sleeve member 22 about the primary rotational axis R (in response to rotation of the drive shaft S) correspondingly linearly displaces the nut member 24 generally along the primary rotational axis R. The nut member 24 further includes a mounting post or stem 48 (FIG. 2) extending from an outer surface 49 of the nut member 24 in a direction generally perpendicular to the primary rotational axis R. As discussed below, the post 48 is configured to securely engage the magnet member 26 to the nut member 24. Although the nut member 24 has been illustrated and described as having a multi-piece cylindrical-shaped configuration, it should be understood that other configurations are also contemplated including, for example, a single-piece configuration. Additionally, it should be appreciated that the nut member 24 may be formed of any suitable material including, for example, metallic materials or non-metallic materials such as plastics or polymers.

In the illustrated embodiment, the magnet member 26 has a cylindrical-shaped configuration defining a central passage extending therethrough that is sized and shaped for receipt of the mounting post 48 of the nut member 24 therein to engage the magnet member 26 to the nut member 24. The magnet member 26 may be secured to the post 48 by any method known to those of skill in the art such as, for example, via a friction fit or by a fastener or a fastening agent. In the illustrated embodiment, the magnet member 26 extends transversely from a generally flat/truncated outer surface of the nut member 24. However, it should be understood that the magnet member 26 may be engaged of coupled to other portions of the nut member 24 and/or may be positioned at other orientations relative to the nut member 24. Additionally, other methods for securing the magnet member 26 to the nut member 24 are also contemplated, the details of which would be know to those having ordinary skill in the art. In one embodiment, the magnet member 26 is a rare earth magnet. However, it should be understood that other types of magnets are also contemplated for use in association with the present invention. Although the magnetic member 26 has been illustrated and described as having a single-piece cylindrical-shaped configuration, it should be understood that other configurations are also contemplated including, for example, a multi-piece configuration and/or a solid configuration. In still other embodiments, the magnet member 26 may be provided with one or more elements that adjust, modify and/or concentrate the magnetic field or flux generated by the magnet member 26 including, for example, a flux ring extending about the magnet member 26 or a flux plate attached to or positioned adjacent the magnet member 26.

Referring to FIG. 1, the non-contact magnetic sensor 28 is provided to sense a change in the axial position of the nut member 24 along the primary rotational axis R via sensing a corresponding variation in the magnetic field generated by the magnet member 26 as the nut member 24 and the magnet member 26 are displaced generally along the primary rotational axis R and along a substantially linear travel path in response to rotation of the drive shaft S. The non-contact sensor 28 in turn generates an output signal representative of the relative rotational angular position of the drive shaft S. Referring collectively to FIGS. 1 and 5-7, as indicated above, the sensor assembly 20b is provided as a non-contact magnetic sensor 28 generally including a sensor housing or mount 50 and a sensor device 52 positioned within and/or attached to the sensor housing 50.

In the illustrated embodiment, the sensor housing 50 generally includes a base portion 50a defining a slotted channel 54 extending therethrough and arranged generally along a channel axis C that is laterally offset from and arranged generally parallel with the primary rotational axis R. In one embodiment, the channel axis C is laterally offset from the primary rotational axis R by an off-axis offset distance d (FIG. 1). However, it should be understood that other positions and orientations of the channel axis C relative to the primary rotational axis R are also contemplated. The sensor housing 50 is preferably stationarily mounted or attached to a non-movable surface or substrate by any method known to those having ordinary skill in the art such as, for example, via screws or bolts (not shown) passing through apertures or openings 53 defined through one or more flange portions 50b extending from the base portion 50a of the sensor housing 50 such that the sensor housing 50 is maintained in a relatively stationary position relative to the nut member 24. The channel 54 has a channel width w (FIG. 5) that is preferably sized in relatively close tolerance with the outer diameter D of the magnet member 26 (FIG. 2) so as to allow the magnet member 26 to be linearly displaced through the channel 54 generally along the channel axis C while preventing the nut member 24 from rotating about the primary rotational axis R. In this manner, the channel 54 acts as a linear guide for the magnet member 26 so as to guide the nut member 24 and the magnet member 26 generally along the channel axis C. In one embodiment, the channel 54 has a rectangular-shaped inner cross section. However, other shapes and configurations of the channel 54 are also contemplated.

In the illustrated embodiment, the sensor housing 50 further includes a compartment or recess 56 (FIG. 6) positioned proximately adjacent the channel 54 that is sized and shaped for receipt of the magnetic sensor device 52 therein so as to position the sensor device 52 in close proximity to the magnet member 26, which is in turn positioned within the channel 54. The sensor device 52 preferably does not physically contact the magnet member 26 or the nut member 24. The sensor device 52 may be secured within the sensor housing compartment 56 by any method know to those having ordinary skill in the art including, for example, by mounting pins/posts, fasteners, and/or an adhesive. The sensor housing 50 further includes a cover 57 that encloses the compartment 56 to protect the sensor device 52 positioned therein and/or to serve as a barrier to prevent debris or other environmental contaminants from entering the compartment 56. Additionally, the sensor housing 50 may be provided with an electrical connector 58 for electrically connecting an electrical cable or wire harness (not shown) to the sensor device 52, and with the electrical cable or wire harness in turn electrically connected to electronic circuitry or a vehicle control system such as a computer or another type of computing device or control device. Although the sensor housing 50 has been illustrated and described as having a particular shape and configuration, it should be understood that other shapes and configurations are also contemplated as would occur to those having ordinary skill in the art. Additionally, it should be appreciated that the sensor housing 50 may be formed of any suitable material including, for example, metallic materials or non-metallic materials such as plastics or polymers.

Figures 5, 6, 7:
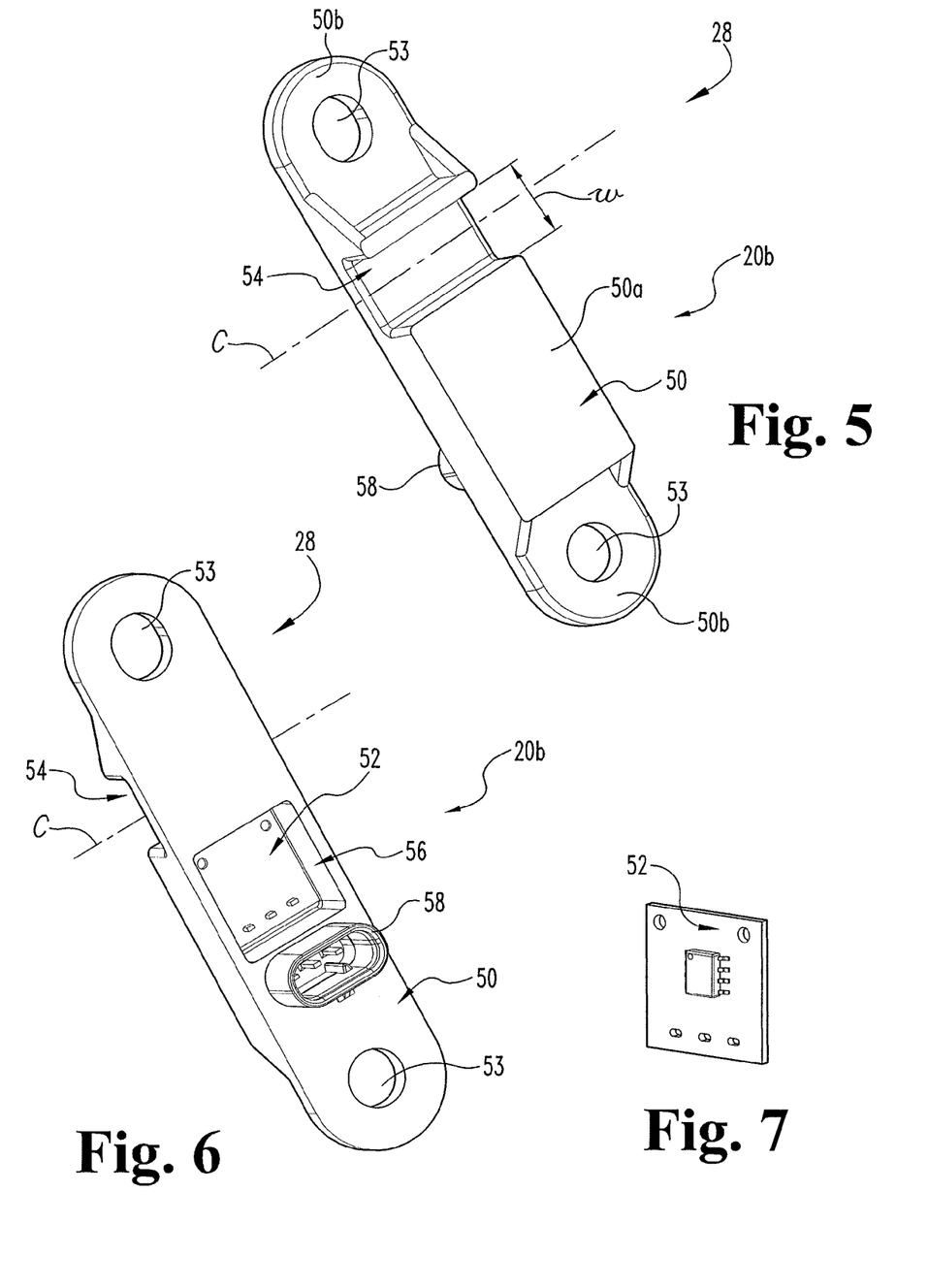
FIG. 5 illustrates a perspective view of one embodiment of a sensor assembly for use in association with the magnetic position sensor assembly of FIG. 1.
FIG. 6 illustrates another perspective view of the sensor assembly of FIG. 5 with the cover to the sensor housing removed for clarity.
FIG. 7 illustrates a perspective view of one embodiment of a magnetic flux sensor for use in association with the sensor assembly of FIG. 5.

In the illustrated embodiment, the magnetic sensor device 52 is provided as a magnetic flux sensor configured to sense changes in the magnetic field generated by the magnet member 26 along a sensing axis as the nut member 24 and the magnet member 26 are displaced generally along the primary rotational axis R in response to rotation of the sleeve member 22 and the drive shaft S. For purposes of the present invention, a "magnetic flux sensor" is broadly defined as any device that is operable to sense magnetic flux density and to generate an electronic signal representative of the magnitude of the magnetic flux density. In the illustrated embodiment, the magnetic flux sensor device 52 comprises a single 3-D linear Hall effect sensor device. However, it should be understood that the use of other types of Hall effect sensors are also contemplated. Further details regarding the characteristics and operation of a magnetic flux sensor device suitable for use in association with the present invention are disclosed in U.S. Pat. No. 6,137,288, the contents of which are incorporated herein by reference in their entirety. However, it should also be understood that other types of magnetic flux sensor devices are also contemplated for use in association with the present invention including, for example, a magneto-resistive (MR) sensor device, a magnetic diode sensor device, an inductive sensor device, a contact type sensor device, or any other magnetic field-sensitive sensor device that would occur to one of skill in the art.

Referring once again to FIG. 1, as the sleeve member 22 is rotated about the primary rotational axis R in the direction of arrows A (in response to corresponding rotation of the drive shaft S), the nut member 24 is linearly displaced generally along the primary rotational axis R in the direction of arrows B up and down the sleeve member 22, which in turn linearly displaces the magnet member 26 along the channel axis C of the channel 54. The nut member 24 thereby serves to convert or transform primary rotational movement of the sleeve member 22 into secondary linear movement of the magnet member 26. As should be appreciated, as the magnet member 26 is displaced along the channel 54 along a linear travel path, the magnetic field generated by the magnet member 26 adjacent the magnetic flux sensor device 52 correspondingly varies.

The magnetic flux sensor device 52 thereby senses varying magnitudes of magnetic flux density as the nut member 24 and the magnet member 26 are linearly displaced in a direction generally along the channel axis C in response to primary rotational displacement of the sleeve member 22 and the drive shaft S about the primary rotational axis R. It should be appreciated that the magnetic field strength or flux density detected by the magnetic flux sensor device 52 is proportional to the rotational position of the sleeve member 22 and the drive shaft S about the primary rotational axis R. Additionally, in response to variation in the sensed magnitude of magnetic flux density, the magnetic flux sensor device 52 generates an electronic voltage signal that is proportional to the sensed magnitude of magnetic flux density, which in turn corresponds to the absolute rotational position of the sleeve member 22 and the drive shaft S about the primary rotational axis R. In a preferred embodiment of the invention, the magnitude of the magnetic flux density sensed by the magnetic flux sensor device 52 varies in a substantially linear manner in response to a change in the rotational position of the sleeve member 22 and the drive shaft S.

As should be appreciated, the magnetic flux sensor device 52 senses changes in the magnetic field generated by the magnet member 26 along a sensing axis (corresponding to the channel axis C) that is laterally offset from the primary rotational axis R. The magnetic flux sensor device 52 in turn produces a linear electrical output signal (i.e., a linear voltage output signal) that is proportional to the absolute angular position of the sleeve member 22 and the drive shaft S, as well as the number of rotations over the rotational travel of the sleeve member 22 and the drive shaft S. In one embodiment, the rotational range of travel of the sleeve member 22 and the drive shaft S exceeds 360° (i.e., greater than one full revolution). In another embodiment, the rotational range of travel of the sleeve member 22 and the drive shaft S is −720° to +720°, wherein an absolute angle measurement of the sleeve member 22 and the drive shaft S of over 1440° (i.e., four full rotational turns) may be achieved. In a further embodiment, the rotational range of travel of the sleeve member 22 and the drive shaft S is −900° to +900°, wherein an absolute angle measurement of the sleeve member 22 and the drive shaft S of over 1800° (i.e., five full rotational turns) may be achieved. The conversion of the primary rotational travel of the sleeve member 22 and the drive shaft S to the secondary linear travel of the nut member 24 and the magnet member 26 allows the magnetic flux sensor device 52 to measure absolute position over rotational travel greater than 360° without the need for complicated mechanical parts or additional electronics associated with the magnetic flux sensor device 52. Additionally, the magnet member 26 need not be attached directly to the drive shaft S, and the magnetic flux sensor device 52 can be positioned to sense variations in the magnetic field along a linear sensing axis at a location offset from the primary rotational axis R by an off-axis offset distance d.

Accordingly, the magnetic position sensor assembly 20 is capable of measuring absolute angular position over the entire range of steering wheel rotational travel (i.e., exceeding one full revolution). As indicated above, although the magnetic position sensor assembly 20 is contemplated for use in sensing the absolute rotational position of a drive shaft S associated with a steering mechanism, it should be understood that other applications are also contemplated, including applications to sense the rotational angular position of other types and configurations of rotating structures.

Referring to FIGS. 8-15, shown therein is a magnetic position sensor assembly 60 according to another form of the present invention for measurement of a rotational angular position of a rotating structure. In one embodiment, the magnetic position sensor assembly 60 is used in association with an automotive steering mechanism to measure the absolute angular position of a steering column shaft across greater than a full revolution of the shaft. However, it should be understood that in other embodiments, the magnetic position sensor assembly 60 may be used in other applications to measure the absolute angular position of a steering column shaft across one full revolution or less than one full revolution of the shaft. Additionally, it should further be understood that the magnetic position sensor assembly 60 may also be used in association with other non-steering and/or non-automotive applications to measure the angular position of other types and configurations of rotating structures.

Figure 8:
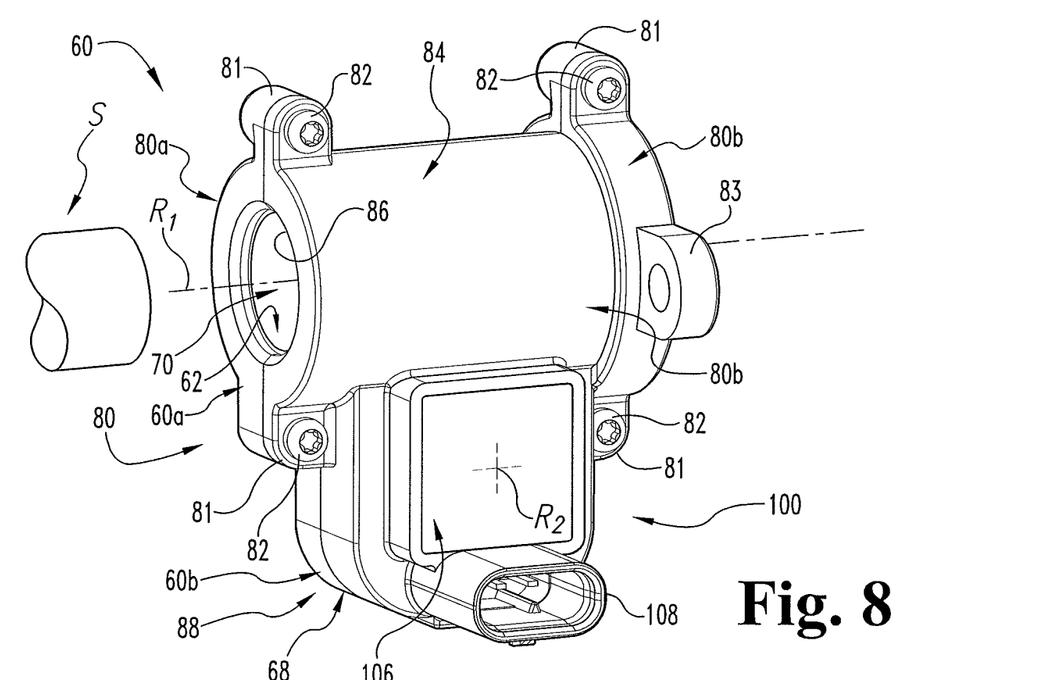
FIG. 8 illustrates a perspective view of a magnetic position sensor assembly according to another form of the present invention.
Figure 9:
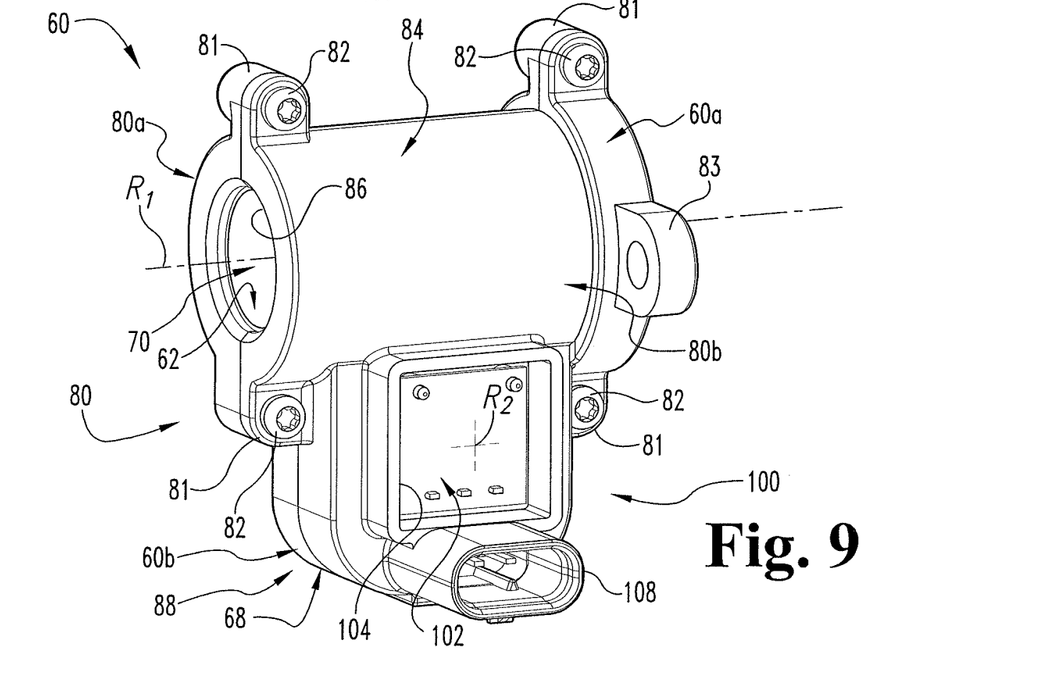
FIG. 9 illustrates a perspective view of the magnetic position sensor assembly of FIG. 8 with the cover to the sensor housing removed for clarity.
Figure 10:
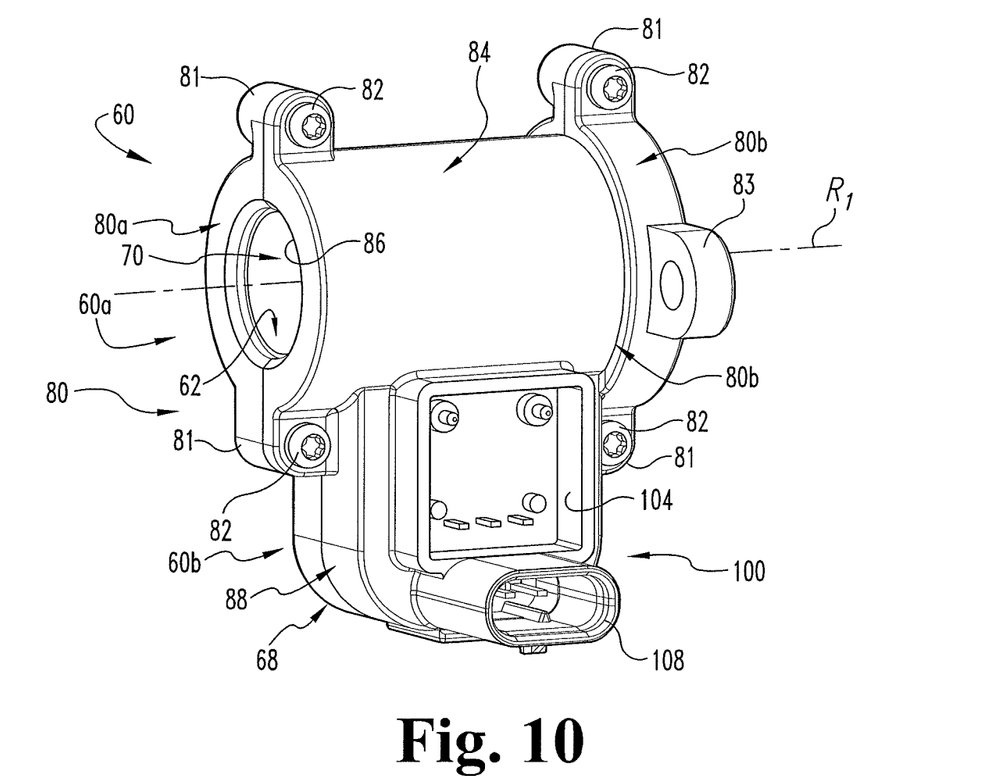
FIG. 10 illustrates a perspective view of the magnetic position sensor assembly of FIG. 9 with the magnetic flux sensor removed from the sensor housing for clarity.

As illustrated in FIG. 8, the magnetic position sensor assembly 60 generally includes an actuator assembly 60a and a sensor assembly 60b. In the illustrated embodiment, the actuator assembly 60a and the sensor assembly 60b are integral with one another so as to define an integrated magnetic position sensor assembly 60. However, other embodiments are also contemplated wherein the sensor assembly 60b is not integrated with the actuator assembly 60a, but are instead provided as separate assemblies that operatively interact with one another to provide the magnetic position sensor assembly 60.

In the illustrated embodiment, the actuator assembly 60a generally includes a shaft member 62, a motion conversion member 64 engaged with the shaft member 22 and structured to convert primary rotational movement of the shaft member 62 into secondary movement different from the primary rotational movement for measurement by the sensor assembly 60b, and a magnet member 66 associated with the motion conversion member 64 to provide a magnetic field or flux for sensing by the sensor assembly 60b. In one specific embodiment, the shaft member 62 is configured as a worm gear member, and the motion conversion member 64 is configured as a multi-tooth gear member intermeshingly engaged with the threaded worm member to convert the primary rotational movement of the shaft member 62 into secondary rotational movement of the magnet member 66 for measurement and sensing by the sensor assembly 60b. However, other configurations of the actuator assembly 60a and the motion conversion member 64 are also contemplated to convert the primary rotational movement of the shaft member 62 into other types of secondary movement for measurement by the sensor assembly 60b.

Additionally, in the illustrated embodiment, the sensor assembly 60b is provided as a non-contact magnetic sensor 68 that generally includes a sensor housing or mount 100 and a magnetic sensor device 102 positioned within and/or attached to the sensor housing 100. However, it should be understood that other types and configurations of the sensor assembly 20b are also contemplated. As will be discussed in greater detail below, at least a portion of the actuator assembly 60a is movable relative to the sensor assembly 60b, with the sensor assembly 60b remaining in a substantially stationary position. However, other embodiments are also contemplated where at least a portion of the sensor assembly 60b may be movable. Further details regarding the actuator assembly 60a and the sensor assembly 60b will be set forth below.

Referring collectively to FIGS. 8-15, in the illustrated embodiment, the shaft member 62 extends generally along a primary rotational axis $R_1$ and is configured for engagement with a rotating structure S. In one embodiment, the rotating structure S is configured as a drive shaft such as, for example, a rotating steering column shaft. However, as indicated above, the magnetic position sensor assembly 60 may be used in non-steering column applications to measure the angular position of other types and configurations of rotating shafts or structures.

In the illustrated embodiment, the shaft member 62 is configured as a cylindrical-shaped sleeve defining an axial passage 70 extending therethrough generally along the primary rotational axis $R_1$, and further defining an external worm gear 72 (FIGS. 12 and 14) or other types of gear-like structures along at least a portion of its length. The sleeve member 62 is positioned over the drive shaft S with at least a portion of the drive shaft S located within the axial passage 70. The sleeve member 62 is rotationally secured to the drive shaft S by any method known to those having ordinary skill in the art such as, for example, by providing adjacent portions of the sleeve member 62 and the drive shaft S with mating non-circular cross sections, or by rotational locking structures including keys/keyways, pins or fasteners, such that rotation of the drive shaft S correspondingly rotates the sleeve member 62 about the primary rotational axis $R_1$. In the illustrated embodiment, the drive shaft S and the sleeve member 62 each rotate about the primary rotational axis $R_1$. However, in other embodiments, the drive shaft S may rotate about an axis that is laterally and/or angularly offset from the primary rotational axis $R_1$. Although the sleeve member 62 has been illustrated and described as having a single-piece cylindrical-shaped configuration, it should be understood that other configurations are also contemplated including, for example, a multi-piece sleeve configuration and/or a solid shaft configuration. Additionally, it should be appreciated that the sleeve member 62 may be formed of any suitable material including, for example, metallic materials or non-metallic materials such as plastics or polymers.

As indicated above, in the illustrated embodiment, the motion conversion member 64 is configured as a multi-tooth gear member intermeshingly engaged with the worm member 62 such that rotation of the worm gear member 62 about the primary rotational axis $R_1$ (in response to rotation of the drive shaft S) correspondingly rotates the gear member 64 about a secondary rotational axis $R_2$ to convert or transform the primary rotational movement of the worm gear member 62 into secondary rotational movement of the multi-tooth gear member 64 (and the magnet member 66) for measurement and sensing by the sensor assembly 60b. In the illustrated embodiment, the secondary rotational axis $R_2$ of the multi-tooth gear member 64 is laterally offset from the primary rotational axis $R_1$ of the worm gear member 62 by an off-axis offset distance d (FIG. 12), and with the secondary rotational axis $R_2$ arranged generally perpendicular or normal to the primary rotational axis $R_1$. However, it should be understood that other positions and orientations of the primary and secondary rotational axes $R_1$, $R_2$ are also contemplated. Additionally, in one embodiment, the multi-tooth gear member 64 is maintained in a linearly stationary position relative to the rotating worm gear member 62 during rotational displacement about the secondary rotational axis $R_2$. However, other embodiments are also contemplated wherein the multi-tooth gear member 64 may be allowed a certain degree of linear freedom relative to the worm gear member 62.

Figure 12:
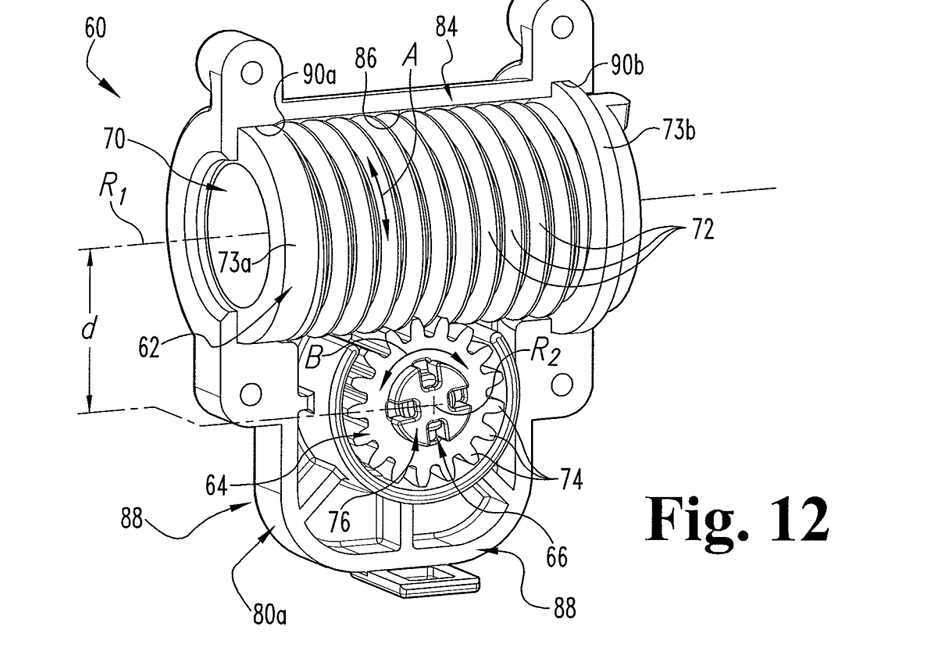
FIG. 12 illustrates a perspective view of one embodiment of an actuator assembly for use in association with the magnetic position sensor assembly of FIG. 8.
Figure 13:
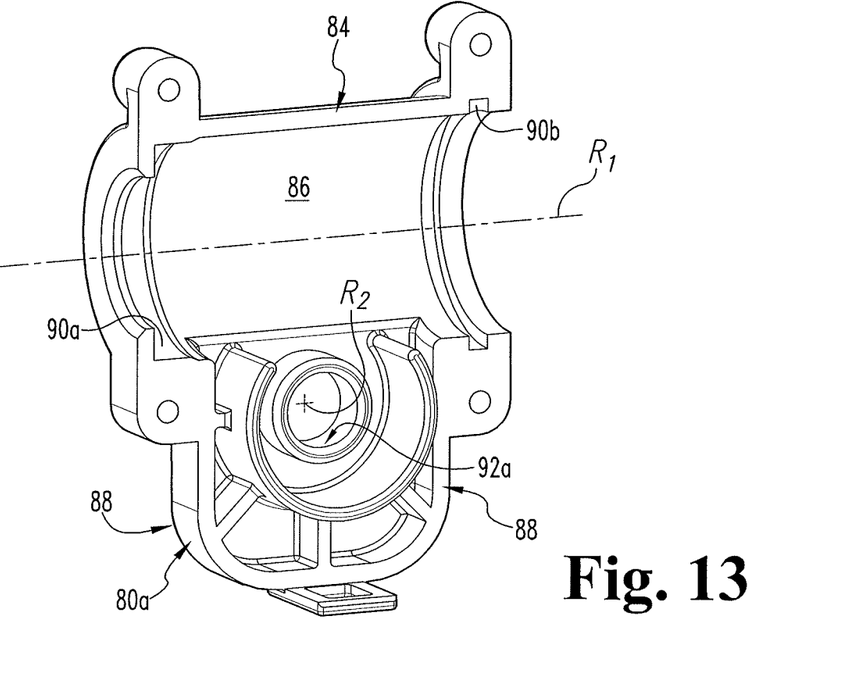
FIG. 13 illustrates a perspective view of a first half of one embodiment of an actuator housing for use in association with the actuator assembly of FIG. 12.

In the illustrated embodiment, the multi-tooth gear member 64 includes a series of gear teeth 74 that intermeshingly engage with the external worm gear 72 formed about the worm gear member 62 such that rotation of the worm gear member 62 about the primary rotational axis $R_1$ (in response to rotation of the drive shaft S) correspondingly rotates the multi-tooth gear member 64 about the secondary rotational axis $R_2$. The multi-tooth gear member 64 includes a central shaft or pin 76 which serves to rotationally mount the multi-tooth gear member 64 within a gear mount or housing member 80 for rotational movement of the multi-tooth gear member 64 about the secondary rotational axis $R_2$, the details of which will be set forth below. Additionally, it should be appreciated that the multi-tooth gear member 64 may be formed of any suitable material including, for example, metallic materials or non-metallic materials such as plastics or polymers.

In the illustrated embodiment, the magnet member 66 has a circular pin-shaped or disc-shaped configuration and is embedded within the multi-tooth gear member 64. However, other shapes and configurations of the magnet member 66 are also contemplated as would occur to those of skill in the art.

In one embodiment, the magnet member 66 is molded within the multi-tooth gear member 64. However, in other embodiments, the magnet member 66 may be positioned within an opening or cavity formed in the gear member 64 and secured therein by any method known to those of ordinary skill in the art such as, for example, via a friction fit or by a fastener or a fastening agent. In one embodiment, the magnet member 66 is radially offset from the secondary rotational axis $R_2$ and is oriented in a direction generally parallel with the secondary rotational axis $R_2$. Accordingly, rotation of the multi-tooth gear member 64 about the secondary rotational axis $R_2$ correspondingly rotates the magnet member 66 about the secondary rotational axis $R_2$ and displaces the magnet member 66 generally along a circumferential travel path having a center corresponding to the secondary rotational axis $R_2$. However, it should be understood that the magnet member 66 may be engaged to other portions of the gear member 64, at other locations relative to the gear member 64, and/or may be positioned in other orientations relative to the gear member 64. Additionally, other methods for securing the magnet member 66 to the gear member 64 are also contemplated, the details of which would be know to those of ordinary skill in the art. For example, instead of embedding/molding the magnet member 66 within the gear member 64, the magnet member 66 may be attached to an outer surface of the gear member 64.

In one embodiment, the magnet member 66 is a rare earth magnet. However, it should be understood that other types of magnets are also contemplated for use in association with the present invention. Additionally, although the magnetic member 66 has been illustrated and described as having a single-piece configuration, it should be understood that multi-piece configurations are also contemplated. In still other embodiments, the magnet member 66 may be provided with one or more elements that adjust, modify and/or concentrate the magnetic field or flux generated by the magnet member 66 including, for example, a flux ring extending about the magnet member 66 or a flux plate attached to or positioned adjacent the magnet member 66.

In the illustrated embodiment, the gear mount or housing member 80 comprises a two-piece structure including a first half 80a (FIGS. 12 and 13) and a second half 80b (FIGS. 14 and 15), with the first and second halves 80a, 80b secured together via screws or fasteners 82 extending through aligned apertures in tabs or flanges 81 defined by each of the housing halves 80a, 80b. However, in other embodiments, the gear mount or housing member 80 may be configured as a single-piece structure. Additionally, in one embodiment, the housing member 80 is stationarily mounted or attached to a non-movable surface or substrate by any method known to those of ordinary skill in the art such as, for example, via screws or bolts (not shown) passing through apertures in one or more flanges 83 extending laterally from one or both of the first and second halves 80a, 80b such that the housing member 80 is maintained in a relatively stationary position.

In one embodiment, the gear housing 80 includes a generally cylindrical mounting portion 84 defining an axial opening 86 extending therethrough that is sized and configured to rotationally receive the worm gear member 62 therein, and a flange portion 88 extending transversely from the cylindrical mounting portion 84. The cylindrical mounting portion 84 further defines a pair of annular grooves or journals 90a, 90b positioned at opposite ends of the axial opening 86 which rotationally receive annular flanges 73a, 73b extending radially outward from the worm gear member 62 to thereby rotationally mount the worm gear member 62 within the cylindrical mounting portion 84 for rotational movement about the primary rotational axis $R_1$. The flange portion 88 includes a pair of internal rotational mounts or bearing portions 92a, 92b (FIGS. 13 and 15) arranged generally opposite one another and generally along the secondary rotational axis $R_2$ for rotationally receiving the central shaft or pin 76 associated with the multi-tooth gear member 64 to thereby rotationally mount the multi-tooth gear member 64 within the housing member 60 for rotational movement of the multi-tooth gear member 64 about the secondary rotational axis $R_2$.

Referring collectively to FIGS. 8-11, the sensor assembly 60b including the non-contact magnetic sensor 68 is provided to sense a change in the rotational position of the multi-tooth gear member 64 about the secondary rotational axis $R_2$ via sensing a corresponding variation in the magnetic field generated by the magnet member 66 as the multi-tooth gear member 64 and the magnet member 66 are rotated about the secondary rotational axis $R_2$ in response to rotational movement of the worm gear member 62 (and the drive shaft S) about the primary rotational axis $R_1$. The non-contact sensor 68 in turn generates an output signal representative of the relative rotational angular position of the drive shaft S.

As indicated above, the sensor assembly 60b generally includes a sensor housing or mount 100 and a sensor device 102 positioned within and/or attached to the sensor housing 100. As also indicated above, in one embodiment, the actuator assembly 60a and the sensor assembly 60b are integral with one another so as to define an integrated magnetic position sensor assembly 60. More specifically, the sensor housing 100 is formed integral with the flange portion 88 of the gear housing 80 such as, for example, by molding the sensor housing 100 integrally with the gear housing 80. However, as further indicated above, other embodiments are also contemplated wherein the sensor assembly 60b is not integrated with the actuator assembly 60a including, for example, embodiments where the sensor housing 100 and the gear housing 80 are provided as separate structures that are subsequently attached or placed in close proximity to one another.

In the illustrated embodiment, the sensor housing 100 includes a compartment or recess 104 (FIGS. 9 and 10) positioned in generally alignment with the multi-tooth gear member 64 such that the compartment 104 is positioned generally along the secondary rotational axis $R_2$. Additionally, the compartment 104 is sized and shaped for receipt of the magnetic sensor device 102 therein so as to position the sensor device 102 in relatively close proximity to the magnet member 66 attached to the multi-tooth gear member 64. However, the sensor device 102 preferably does not physically contact the magnet member 66 or the multi-tooth gear member 64. The sensor device 102 may be secured within the sensor housing compartment 104 by any method know to those having ordinary skill in the art including, for example, by mounting pins/posts, fasteners and/or an adhesive. The sensor housing 100 further includes a cover 106 (FIG. 8) that encloses the compartment 104 to protect the sensor device 102 positioned therein and/or to serve as a barrier to prevent debris or other environmental contaminants from entering the compartment 104. Additionally, the sensor housing 100 may be provided with an electrical connector 108 (FIGS. 8-10) for electrically connecting an electrical cable or wire harness (not shown) to the sensor device 102, and with the electrical cable or wire harness in turn electrically connected to electronic circuitry or a vehicle control system such as a computer or another type of computing device or control device. Although the sensor housing 100 has been illustrated and described as having a particular shape and configuration, it should be understood that other shapes and configurations are also contemplated as would occur to those having ordinary skill in the art. Additionally, it should be appreciated that the sensor housing 100 may be formed of any suitable material including, for example, metallic materials or non-metallic materials such as plastics or polymers.

Figure 11:
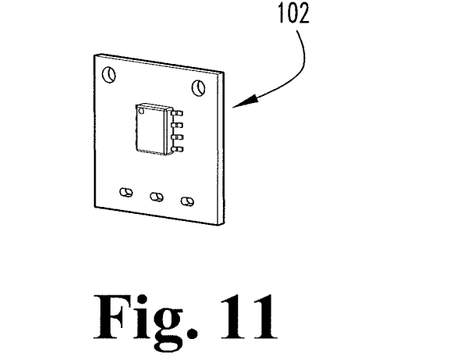
FIG. 11 illustrates a perspective view of one embodiment of a magnetic flux sensor for use in association with the magnetic position sensor assembly of FIG. 8.

In the illustrated embodiment, the magnetic sensor device 102 is provided as a magnetic flux sensor configured to sense changes in the magnetic field generated by the magnet member 66 along an arc-shaped or circumferential sensing axis as the multi-tooth gear member 64 and the magnet member 66 are rotationally displaced about the secondary rotational axis $R_2$ in response to rotation of the worm gear member 62 and the drive shaft S about the primary rotational axis $R_1$. For purposes of the present invention, a "magnetic flux sensor" is broadly defined as any device that is operable to sense magnetic flux density and to generate an electronic signal representative of the magnitude of the magnetic flux density. In the illustrated embodiment, the magnetic flux sensor device 102 comprises a single 3-D linear Hall effect sensor device. However, it should be understood that two or more Hall effect sensors may be used, and that other types of Hall effect sensors are also contemplated. Further details regarding the characteristics and operation of a magnetic flux sensor device suitable for use in association with the present invention are disclosed in U.S. Pat. No. 6,137,288, the contents of which are incorporated herein by reference in their entirety. It should also be understood that other types of magnetic flux sensor devices are also contemplated for use in association with the present invention including, for example, a magneto-resistive (MR) sensor device, a magnetic diode sensor device, an inductive sensor device, a contact type sensor device, or any other magnetic field-sensitive sensor device that would occur to one of ordinary skill in the art.

Figure 14:
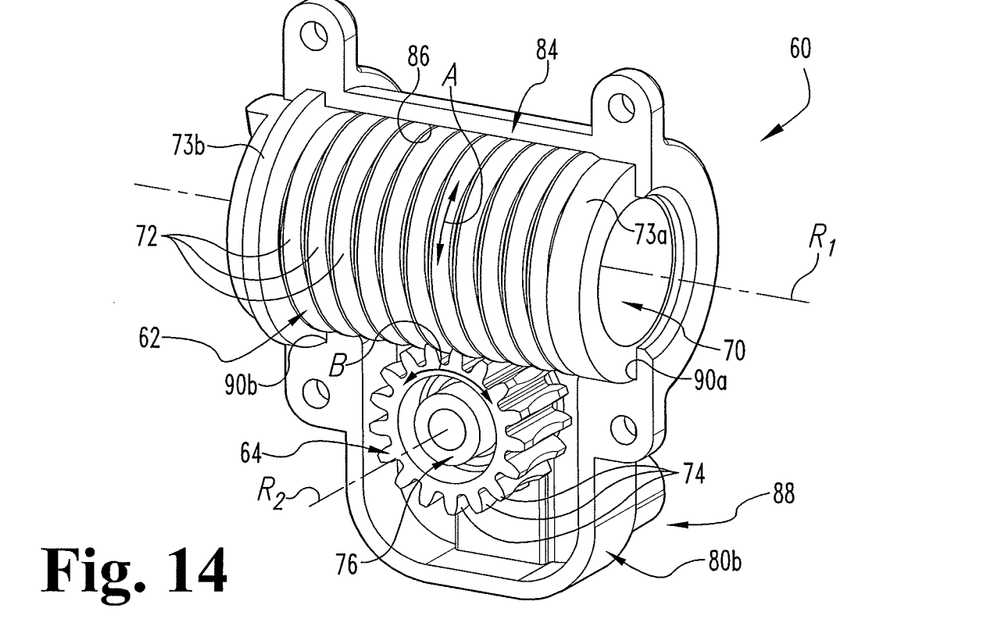
FIG. 14 illustrates another perspective view of the actuator assembly of FIG. 12.
Figure 15:
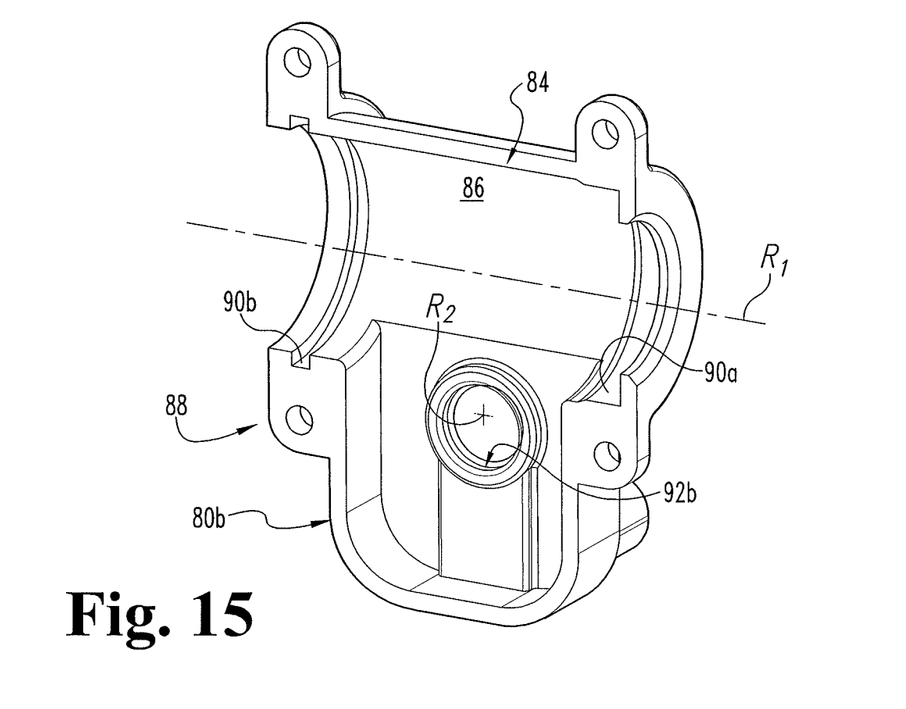
FIG. 15 illustrates a perspective view of a second half of the actuator housing for use in association with the actuator assembly of FIG. 12.

Referring to FIGS. 12 and 14, as the worm gear member 62 is rotated about the primary rotational axis $R_1$ in the direction of arrows A (in response to rotation of the drive shaft S), the multi-tooth gear member 64 is correspondingly rotated about the secondary rotational axis $R_2$ in the direction of arrows B, which in turn rotationally displaces the magnet member 66 along an arc-shaped or circumferential travel path extending about the secondary rotational axis $R_2$. The multi-tooth gear member 64 thereby serves to convert primary rotational movement of the worm gear member 62 into secondary rotational movement of the multi-tooth gear member 64 and the magnet member 66. Additionally, a gear reduction ratio between the worm gear member 62 and the multi-tooth gear member 64 serves to reduce rotational movement of the worm gear member 62 to lesser rotational movement of the multi-tooth gear member 64. In one embodiment, the gear reduction ratio between worm gear member 62 and the multi-tooth gear member 64 is approximately 5:1 such that five rotations of the worm gear member 62 (and the drive shaft S) about the primary rotational axis $R_1$ results in one full rotation of the multi-tooth gear member 64 and the magnet member 66 about the secondary rotational axis $R_2$. In other words, 1800° rotation (e.g., five full rotational turns) of the worm gear member 62 (and the drive shaft S) results in 360° rotation (e.g., one full rotational turn) of the multi-tooth gear member 64 and the magnet member 66. However, it should be understood that other gear reduction ratios between the worm gear member 62 and the multi-tooth gear member 64 are also contemplated. Additionally, a "multi-entry" or "multi-start" configuration of the worm gear member 62 can also be used to further reduce the gear reduction ratio between worm gear member 62 and the multi-tooth gear member 64. One example of a "multi-entry" or "multi-start" worm gear configuration is disclosed, for example, at http://en.wikipedia.org/wiki/File-.Worm_Gear.gif, the contents of which are incorporated herein by reference in their entirety.

As should be appreciated, as the magnet member 66 is displaced along the arc-shaped or circumferential travel path, the magnetic field generated by the magnet member 66 adjacent the magnetic flux sensor device 102 correspondingly varies. The magnetic flux sensor device 102 thereby senses varying magnitudes of magnetic flux density as the multi-tooth gear member 64 and the magnet member 66 are rotationally displaced about the secondary rotational axis $R_2$ in response to rotational displacement of the worm gear member 62 and the drive shaft S about the primary rotational axis $R_1$. It should be appreciated that the magnetic field strength or flux density detected by the magnetic flux sensor device 102 is proportional to the rotational position of the worm gear member 62 and the drive shaft S about the primary rotational axis $R_1$. Additionally, in response to variation in the sensed magnitude of magnetic flux density, the magnetic flux sensor device 102 generates an electronic voltage signal that is proportional to the sensed magnitude of magnetic flux density, which is in turn corresponds to the absolute rotational position of the worm gear member 62 and the drive shaft S about the primary rotational axis $R_1$. In a preferred embodiment of the invention, the magnitude of the magnetic flux density sensed by the magnetic flux sensor device 102 varies in a substantially linear manner in response to a change in the rotational position of the worm gear member 62 and the drive shaft S.

As should be further appreciated, the magnetic flux sensor device 102 senses changes in the magnetic field generated by the magnet member 66 along the arc-shaped or circumferential travel path extending about the secondary rotational axis $R_2$ which is laterally offset from the primary rotational axis $R_1$. The magnetic flux sensor device 102 in turn produces a linear electrical output signal (i.e., a linear voltage output signal) that is proportional to the absolute angular position of the worm gear member 62 and the drive shaft S, as well as the number of rotations over the rotational travel of the worm gear member 62 and the drive shaft S. In one embodiment, the rotational range of travel of the worm gear member 62 and the drive shaft S exceeds 360° (i.e., greater than one full revolution). In another embodiment, the rotational range of travel of the worm gear member 62 and the drive shaft S is −720° to +720°, wherein an absolute angle measurement of the sleeve member 22 and the drive shaft S of over 1440° (i.e., four full rotational turns) may be achieved. In a further embodiment, the rotational range of travel of the worm gear member 62 and the drive shaft S is −900° to +900°, wherein an absolute angle measurement of the sleeve member 22 and the drive shaft S of over 1800° (i.e., five full rotational turns) may be achieved.

Thus, an absolute angle measurement of the worm gear member 62 and the drive shaft S over 1800° (e.g., five full rotational turns) may be achieved. The conversion/reduction of the rotational travel of the worm gear member 62 and the drive shaft S to the reduced rotational travel of the multi-tooth gear member 64 and the magnet member 66 allows the magnetic flux sensor device 102 to measure absolute position over rotational travel greater than 360° without the need for complicated mechanical parts or additional electronics (i.e., greater than one magnetic sensor device) associated with the magnetic flux sensor device 102. Additionally, it should be understood that the magnet member 66 need not be attached directly to the drive shaft S, and the magnetic flux sensor device 102 can be positioned to sense variations in the magnetic field along a secondary rotational axis $R_2$ that is offset from the primary rotational axis $R_1$ by an off-axis offset distance d (FIG. 12). Accordingly, the magnetic position sensor assembly 60 is capable of measuring absolute angular position over the entire range of steering wheel rotational travel (i.e., exceeding one full revolution). As indicated above, although the magnetic position sensor assembly 60 is contemplated for use in sensing the absolute rotational position of a drive shaft S associated with a steering mechanism, it should be understood that other applications are also contemplated, including applications to sense the rotational angular position of other types and configurations of rotating shafts and rotating structures.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A magnetic rotational position sensor assembly for measurement of a rotational angular position of a rotating structure, comprising:
    a shaft member extending along a primary rotational axis, said shaft member structured and configured for primary rotational movement about said primary rotational axis in response to rotation of the rotating structure;
    a motion conversion member operatively engaged with said shaft member, said motion conversion member structured and configured to transform said primary rotational movement of said shaft member into secondary movement of said motion conversion member different from said primary rotational movement;
    a magnet member secured to said motion conversion member, said magnet member structured and configured for displacement along a travel path in response to said secondary movement of said motion conversion member; and
    a non-contact magnetic sensor structured and configured to sense a change in position of said magnet member by sensing a corresponding variation in a magnetic field generated by said magnet member during said displacement of said magnet member along said travel path in response to said rotation of the rotating structure, said non-contact magnetic sensor generating an output signal representative of a relative rotational angular position of the rotating structure;
    said shaft member comprises a first gear member structured and configured for rotation about said primary rotational axis;
    said motion conversion member comprises a second gear member structured and configured for rotation about a secondary rotational axis laterally offset from said primary rotational axis, said second gear member intermeshingly engaged with said first gear member; and
    said primary rotational movement of said first gear member rotationally drives said second gear member and reduces said primary rotational movement of said first gear member about said primary rotational axis into secondary rotational movement of said second gear member about said secondary rotational axis;
    said magnet member is rotationally displaced along a circumferential travel path extending about said secondary rotational axis in response to said secondary rotational movement of said second gear member; and
    said non-contact magnetic sensor senses said change in position of said magnet member along said circumferential travel path in response to said rotation of the rotating structure and generates an output signal representative of said relative rotational angular position of the rotating structure, wherein said non-contact magnetic sensor is arranged generally along and intersected by said secondary rotational axis.

2. The magnetic rotational position sensor assembly of claim 1, wherein:
    said first gear member comprises a worm gear extending along said primary rotational axis; and
    said second gear member comprises a multi-tooth gear intermeshingly engaged with said worm gear with said secondary rotational axis arranged generally perpendicular to and laterally offset from said primary rotational axis.

3. The magnetic rotational position sensor assembly of claim 2, wherein said worm gear and said multi-tooth gear define a gearing reduction ratio therebetween of at least 2:1.

4. The magnetic rotational position sensor assembly of claim 3, wherein said worm gear and said multi-tooth gear define a gearing reduction ratio therebetween of approximately 5:1.

5. The magnetic rotational position sensor assembly of claim 1, wherein said first gear member comprises a cylindrical sleeve defining an axial passage extending entirely therethrough along said primary rotational axis; and
    wherein the rotating structure comprises a drive shaft, a portion of said drive shaft positioned with said axial passage and operatively engaged with said cylindrical sleeve such that rotation of said drive shaft about said primary rotational axis correspondingly rotates said cylindrical sleeve about said primary rotational axis.

6. The magnetic rotational position sensor assembly of claim 1, wherein said first gear member is engaged with a steering column shaft having a rotational range exceeding 360°; and
    wherein the magnetic rotational position sensor assembly is configured to measure absolute angular position of said steering column shaft over said rotational range.

7. The magnetic rotational position sensor assembly of claim 1, further comprising a gear housing; and
    wherein said first gear member is rotationally mounted within said gear housing to provide said primary rotational movement about said primary rotational axis; and
    wherein said second gear member is rotationally mounted within said gear housing to provide said secondary rotational movement about said secondary rotational axis.

8. The magnetic rotational position sensor assembly of claim 7, wherein said gear housing defines a compartment arranged generally along said secondary rotational axis; and
    wherein said no more than one of said non-contact magnetic sensor comprises a magnetic flux sensor positioned within said compartment and intersected by said secondary rotational axis; and
    wherein said magnetic flux sensor senses variations in a magnetic field generated by said magnet member as said magnet member is rotationally displaced along said circumferential travel path in response to said rotation of the rotating structure.

9. The magnetic rotational position sensor assembly of claim 1, wherein said magnet member is securely attached to said second gear member at a location radially offset from said secondary rotational axis.

* * * * *